May 4, 1926.

A. H. SNYDER

BATTERY CELL

Filed August 10, 1918

1,583,021

INVENTOR
Almond H. Snyder
BY
John L. Cowling
ATTORNEY

Patented May 4, 1926.

1,583,021

UNITED STATES PATENT OFFICE.

ALMOND H. SNYDER, OF LANCASTER, NEW YORK, ASSIGNOR, BY MESNE ASSIGNMENTS, TO GOULD STORAGE BATTERY COMPANY, INC., A CORPORATION OF NEW YORK.

BATTERY CELL.

Application filed August 10, 1918. Serial No. 249,223.

*To all whom it may concern:*

Be it known that I, ALMOND H. SNYDER, a citizen of the United States, residing in Lancaster, county of Erie, and State of New York, have invented new and useful Improvements in Battery Cells, set forth in the annexed specification and drawing forming a part thereof.

My invention is particularly applicable to that type of battery cell which employs an electrolyte in fluid form and wherein the use of the battery causes gases to be given off which it is desired shall be carried away and discharged at a proper point. It is also particularly applicable to cells subjected to canting or rolling motion and vibration. And as these are conditions usually met with in using batteries aboard submarine vessels, my invention will be described with particular reference to a battery of the so-called submarine type, without the intention of in any way limiting my invention to this type of battery used for example merely to illustrate one embodiment of the same.

Figure 2:
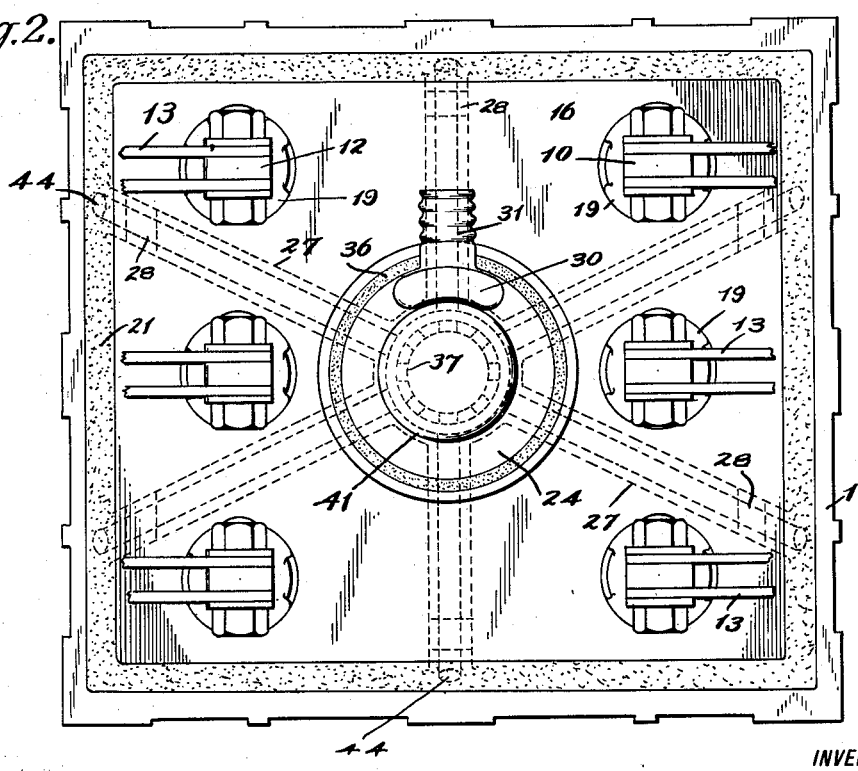
Fig. 2 is a top plan of the cell shown in Fig. 1, showing a slightly modified adjustment of certain of the parts shown in Fig. 1, as will hereinafter more plainly appear.

In the drawing, 1 represents the usual jar or receptacle of suitable material, indicated as hard rubber, for containing the plates or electrodes 2 which may be held in proper relation to each other by any suitable type of supporting means, as for example the lugs 3 and 4 carried by suitable insulating members or supports 5, which in turn are carried by the ledges 6 of the jar 1. The plates may be separated from each other as by means of the usual separators, as indicated at 7, and the jar filled with electrolyte as indicated at 8. All of the positive plates, for example, may be united to a bus-bar 9, in communication with lugs or connectors 10; while the negative plates are connected with a bus-bar 11 provided with suitable connectors or terminals 12. The cell may be connected into circuit by any suitable type of connectors 13, which may be bolted to posts 10 and 12. The posts 10 and 12 are provided with a flanged portion 14 upon which is placed a soft rubber gasket 15. The cover 16, of hard rubber or other suitable material, is provided with apertures registering with the posts 10 and 12 and rests upon the gaskets 15. The posts 10 and 12 are provided above the cover 16 with the gaskets of soft rubber or other yielding material, indicated at 17, upon which there is placed a washer 18 against which the nuts 19 may be forced by making up the same on the threaded portion 20 of the posts 10 and 12. In this manner, a fluid-tight joint between the posts and the cover is readily effected. The cover fits snugly within the receptacle 1 and is provided with a flanged rim which defines a groove or channel between the edge portion of the cover and the top of the jar, which is preferably filled with cement, as indicated at 21, to form a fluid-tight joint between the edge of the cover and the receptacle or jar 1. The cover 16 is provided with a central flanged portion or upwardly extending sleeve 22, and also provided with an annular downwardly extending flange or sleeve 23 concentric with the flange 22; while portions of the cover between the outside of sleeve 23 and the inside of flange 22 are cut away to form passages, as indicated at 24. The interior of the sleeve 23 is counterbored, as indicated at 25, and internally threaded, as indicated at 43. The counterbored portion 25 is connected as by means of ports 26 with passage-ways contained within the webs 27 upon the under side of the cover 16, which passage-ways communicate with the openings or ports 28, formed by cutting away a portion of the webs disposed near the edges of the cover, as indicated in dotted lines in Fig. 2, for a purpose that will hereinafter appear. In practice, it is usually convenient to form the passages in the webs throughout their entire length and through the flanged portion of the cover; and, afterward, the portion of the channel extending from the openings 28 through the flange is plugged up, as shown in the dotted lines at 44 in Fig. 2.

Within the sleeve 22 there are placed a series of concentric baffle-plates 29, of hard rubber or other suitable material, and upon the top of the baffle-plates there rests a cover 30, of hard rubber or other suitable material, provided with a nozzle or tubular connection 31 communicating with the under side of the cover. The said cover is preferably so positioned that a tube leading from the nozzle 31 will not be interfered with by the electrical connections of the cell. And, for that reason, it is usual in practice to revolve the cover and the nozzle into a position approximately 90° from that shown in Fig. 1 (which is chosen for clearness of illustration) into the position occupied in Fig. 2. A hollow sleeve 32, threaded as indicated at 33 and provided with a flange as indicated at 34, is passed through the central opening in the cover 30 and the central opening of the baffle-plates and made up in the threaded portion 43 of the sleeve 23 until the flange 34 is brought down snugly upon the soft rubber washer 35, and then the cover 30 is cemented in its proper position by means of the cement indicated at 36. The sleeve 32 is provided with apertures 37 which communicate with the annular opening 25 and with the interior of the sleeve 32. 38 is a piston, preferably of hard rubber or other insulating material, provided with a soft rubber packing 39 which fits snugly within the sleeve 32 and is provided with a stem or piston rod 40 carrying at its upper end a mushroom top 41 provided on its lower side with a number of radial webs 42 which are so dimensioned and disposed as to hold the stem 40 in a central position and render it impossible to seal the communication between the interior of the sleeve 32 and the atmosphere.

Figure 1:
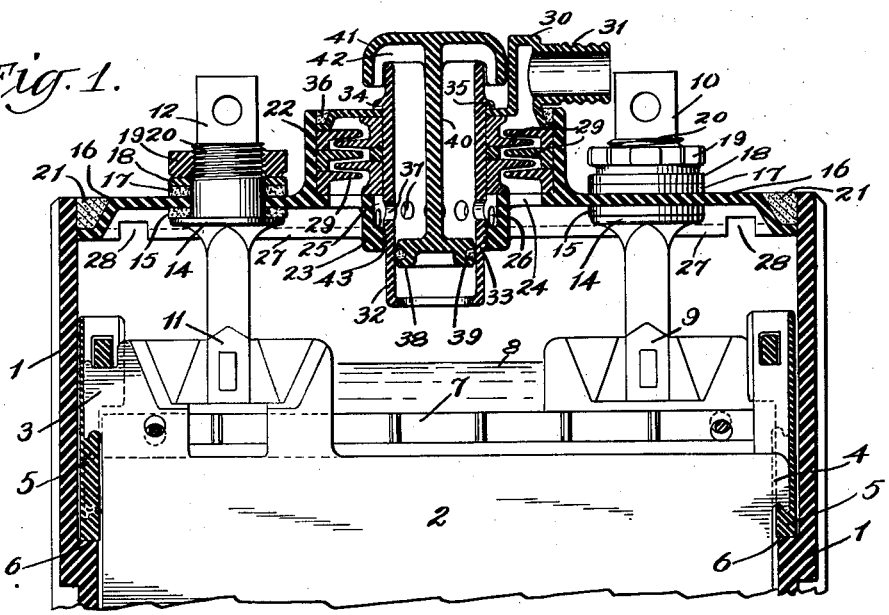
Fig. 1 is a partial section and partial elevation of a portion of a typical submarine battery comprehending one embodiment of my invention.

An operation of my invention is substantially as follows:

If it be desired to add to or take a sample from the electrolyte, one has merely to grasp the mushroom 41 and raise the same sufficiently to remove the piston 38 from the sleeve 32, and then electrolyte may be added or subtracted through the central opening of the sleeve, which may be sealed with respect to the electrolyte 8 by merely placing the piston and the mushroom back into the positions indicated in Fig. 1, as the soft rubber packing 39 carried by the piston 38 serves to effectively close the central opening into the jar or receptacle below the level of the ports 37. If a hose or other suitable means be connected with the tube 31, and the pressure reduced below that of the atmosphere in which the battery is immersed, atmospheric air will be drawn in between the webs 42 of the mushroom 41 and passed downwardly through the bore of the sleeve 32, through the apertures 37, into the annular cavity 25; thence through the ports 26 and passage-ways in 27; thence through openings 28 into the jar or receptacle 1: thence across from the edges of the same to the openings 24; thence through the tortuous passages defined by the baffle-plates to the under side of the cover 30 communicating with the bore of the tube or nipple 31, from which it will pass onwardly through the exhausting means.

It will be obvious that any gases or vapors arising from the electrolyte will be carried off along with this current of air and discharged at a proper point, as may be chosen. Also it will be noted that, if the battery be canted into any position within reasonable limits, the openings 24 and, at least, some of the openings 28, which occur in proximity to the rim of the cover, will always be in communication with the space above the electrolyte. And, therefore, the gases rising into this space will at all times be carried off by the exhausting means in the manner above described. And it will be further noted that by the disposition of the various ports 28 near the rim of the cover, it will be impossible in the ordinary canting of the jar to cause any gas pockets in the corners, as would be possible if the gases were drawn off from some point near the center of the jar or receptacle cover, and the air intake also near the center of the cover.

From the foregoing it will be noted that I have produced a battery cell which may be tightly sealed in such manner that electrolyte will be prevented from spilling or slopping out; while, at the same time, any gaseous products generated in the cell may be carried off and discharged at a desirable location; and that, at all times, regardless of the position of the cell, within the limits of any normal working, any unvented spaces above the electrolyte into which the gases would naturally rise will be avoided.

Further, it will be noted that spray will be prevented from passing outwardly through the inlet port, and slopping of electrolyte through the said port will be prevented, by means of the fluid-tight piston 38; while these effects will be prevented from taking place through the exhaust port by means of the baffle-plate construction indicated at 29; while at any time electrolyte may be added to the cell or samples taken therefrom, with little inconvenience, by removing the piston 38.

I do not wish in any way to limit myself to any of the details of construction above given in order to fully point out one type of construction embodying the essentials of my invention, for it will be obvious that wide departure in the matter of construction may be made without departing from the spirit and scope of my invention, which is set forth in the following claims.

I claim:

1. The combination with a fluid-tight receptacle having a fluid inlet in communication with the interior thereof, of means in operative relation to said inlet whereby fluid entering therethrough is directed and discharged nearer the side walls of said receptacle than the position of said inlet.

2. The combination with a fluid tight receptacle having a fluid inlet in communication with the interior thereof, of means in operative relation to said inlet whereby fluid entering therethrough is directed and discharged nearer the side walls of said receptacle than the position of said inlet, said receptacle also being provided with an outlet whereby the fluid may be drawn from the interior thereof.

3. The combination with a fluid-tight receptacle having a fluid inlet in communication with the interior thereof, of means in operative relation to said inlet whereby fluid entering therethrough is directed and discharged nearer the side walls of said receptacle than the position of said inlet, said receptacle also being provided with an outlet whereby fluid may be drawn from the interior thereof from a location nearer the inlet than the discharge points of fluid entering said receptacle through said inlet.

4. A battery cell, a cover thereon having a centrally disposed air inlet adapted for admitting ventilating air to the upper end of the cell, an air outlet leading from the cell and apron means arranged within the upper end of the cell in substantially parallel relation with the cover.

5. A cell including a receptacle, a cover in fluid-tight relation thereto and provided with a fluid inlet port in the central portion thereof, and means for conveying fluid therefrom to points inside of the receptacle near the side walls thereof.

6. A cell including a receptacle, a cover in fluid-tight relation thereto and provided with a fluid inlet port in the central portion thereof, means for conveying fluid therefrom to points inside of the receptacle in a direction toward and near to the side walls thereof, and means whereby the fluid thus admitted may be exhausted from the receptacle near the central intake.

7. A storage battery cell having a suitable container, with the battery plates and electrolyte therein and a cover for the container, said cover having means for the inlet of air to and the exit of gases from inside the cell above the electrolyte, with the air passing into the cell and the gases passing out of the cell, both through the central part of the cover as distinguished from adjacent the edges thereof and means whereby incoming air is directed laterally over the electrolyte in the cell between a point adjacent the center of the cover and adjacent the edges of the cover.

8. A cell including a receptacle, a cover in fluid-tight relation thereto and provided with a fluid inlet port in the central portion thereof, means for conveying fluid therefrom to points inside of the receptacle near the side walls thereof, and means whereby the fluid thus admitted may be exhausted from the receptacle near the central intake whereby a circulation of air may be maintained from near the center to points near the side walls of the receptacle and then toward the center thereof, and means for preventing moist vapor and liquid from being carried out of the receptacle in said circulating air.

9. In a battery comprising a receptacle and elements immersed in an electrolyte therein, the combination of a cover above the electrolyte in gas-tight relation to said receptacle and having a central air inlet communicating with the under-side of the cover and a concentric outlet communicating with the under-side of the cover and adapted to be connected to an exhausting means.

10. In a storage battery comprising a receptacle and a cover in fluid-tight relation to said receptacle, an inlet device including an opening communicating with the under-side of said cover and the atmosphere and communicating with ports having outlets into the receptacle on the under-side of the said cover at points substantially further distant from the center of the cover than the outlet device.

11. The combination, in a storage battery comprising a receptacle, of a cover held in fixed relation with respect to said receptacle, means for causing a gas-tight joint between said cover and said receptacle, said cover being provided with a central air intake port and means whereby air entering said intake port is discharged on the lower side of said cover at distant points with respect to the inlet.

12. The combination, in a storage battery comprising a receptacle, of a cover held in fixed relation with respect to said receptacle, means for causing a gas-tight joint between said cover and said receptacle, said cover being provided with a central air intake port and means whereby air entering said intake port is discharged on the lower side of said cover at distant points with respect to the inlet combined with an outlet vent device for withdrawing air thus discharged from an opening in said cover nearer the center than said discharge points.

13. A battery cell, a cover therefor hermetically arranged thereon and having a substantially centrally located air inlet surrounded by an air outlet and apron means located in the upper end of the cell adapted to cause the incoming air to be deflected and to be commingled with the gases, and means to withdraw the mixed gases from the cell.

14. In a battery, the combination with a receptacle containing an electrolyte and elements immersed therein, of a cover forming a fluid-tight closure with respect to said receptacle and elements provided with an air inlet for admitting air near the center of the cover, and means for conveying said air to points above the electrolyte near the edge of said cover.

15. A storage battery cell having a cover sealed thereon, said cover having a ventilating air inlet and outlet, both located substantially in the central part of the cover as distinguished from adjacent the edge thereof.

16. In a battery, the combination with a receptacle containing an electrolyte and elements immersed therein, of a cover forming a fluid-tight closure with respect to said receptacle and elements provided with an air inlet for admitting air near the center thereof, means for conveying said air to points near the edge of said cover, and means for causing air to be drawn through said conveying means comprising an exhaust port in juxtaposition to the intake port and combined in a unitary structure therewith.

17. The combination in a battery having a container and a cover in fluid-tight relation thereto, of ventilating means comprehending in the structure thereof a central fluid inlet, a juxtaposed outlet, and means whereby air entering the inlet and leaving the outlet is caused to pass across the interior of the container near the top thereof.

18. The combination in a battery having a container and a cover in fluid-tight relation thereto, of a ventilating device including in its structure means for permitting air to enter the container near the center of the cover, means whereby air may be withdrawn from the container near the central portion of the cover, and means whereby air thus admitted and withdrawn is caused to circulate from the sides of the container toward the center of the cover.

19. The combination in a battery having a container, an electrolyte and elements immersed therein, of a cover in fluid-tight relation to said container above the electrolyte, said container and cover defining an air chamber above said electrolyte into which gases liberated by said elements and electrolyte collect, means for voiding said chamber of such gases including an inlet device whereby air is admitted near the central portion of said cover and discharged near the edges thereof, and means whereby said air and gases may be withdrawn near the central portion of said chamber.

20. The combination in a battery having a container, an electrolyte and elements immersed therein, of a cover in fluid-tight relation to said container above the electrolyte, said container and cover defining an air chamber above said electrolyte into which gases liberated by said elements and electrolyte collect, means for voiding said chamber of such gases including an inlet device whereby air is admitted near the central portion of said chamber and discharged near the sides thereof and means whereby said air and gases may be withdrawn near the central portion of said chamber, said withdrawing means being adapted to be connected to an exhausting means whereby an air current may be maintained from points near the side walls of said chamber toward the center thereof.

21. A storage battery cell having a cover sealed thereon, said cover having a ventilating air inlet and outlet, both located substantially in the central part of the cover as distinguished from adjacent the edge thereof, and means for causing the air to travel transversely over the top of the electrolyte in the cell and below the cover, in passing from the inlet to the outlet.

22. In a battery including a container with an electrolyte and elements immersed therein and a cover, a combined air inlet and outlet device for ventilating the interior of said container including air inlet and outlet openings in close proximity to each other in a unitary structure, and separated from each other by a portion of said structure.

23. In a battery including a container with an electrolyte and elements immersed therein and a cover in fluid-tight relation with respect to said container and said elements, a combined air inlet and outlet device for ventilating the interior of said container including air inlet and outlet openings in close proximity to each other in a unitary structure, one of said openings being provided with a removable closing member whereby electrolyte may be readily added to and withdrawn from the interior of the container.

24. In a battery including a container and a cover in fluid-tight relation thereto, means for admitting air to the interior of said container and withdrawing the same therefrom comprising a device provided with concentric intake and outlet passages and means for directing the intake and outlet of air.

25. A storage battery cell having a cover thereon, said cover having passageways therethrough substantially in the central part of the cover as distinguished from adjacent the edge thereof and forming a ventilating air inlet and outlet for the cell, and a transverse passageway located on the underneath side of the cover, the outer part of said transverse passageway communicating with the space in the cell and the inner part of said transverse passageway communicating with one of said first mentioned passageways.

26. A storage battery cell, having a cover thereon, a substantially centrally disposed opening therethrough, a tubular member located within said opening and spaced therefrom forming an air passage through the tubular member and an air passage on the outside thereof through the cover opening, an exhaust port connected with one of said passages and means in the outlet passage for straining the gases exhausted therethrough.

27. A storage battery cell, having a cover thereon, a substantially centrally disposed opening therethrough, a tubular member located within said opening, and spaced therefrom forming an air inlet passage through the tubular member and an outlet passage on the outside thereof through the cover opening, an exhaust port connected with the outlet passage and means in the outlet passage for straining the gases exhausted therethrough, and means for causing air introduced through said inlet passage to travel transversely over the top of the electrolyte in the cell, in passing from the inlet passage to the outlet passage.

28. A storage battery cell having a cover thereon with a port therethrough in the central portion of the cover, a passageway on the underneath side of said cover, said passageway communicating with said port and extending a substantial distance to the side of the cell, another port extending through the central portion of the cover, one of said ports serving as an inlet for a gaseous ventilating agent and the other of said ports serving as an exhaust for the gases in the cell.

29. The method of ventilating a storage battery cell which consists in admitting a gaseous ventilating agent through an intake port in the central portion of the cover of the cell, exhausting the gases from the cell through an outlet port in the central portion of the cover of the cell and causing the admitted ventilating agent to sweep transversely across the top of the cell underneath the cover to entrain the gases formed in the cell and carry them away through said outlet.

30. A storage battery cell having a suitable container with battery plates and electrolyte therein and a cover for the container, said cover having a filling opening and a removable piston inserted therein to prevent the electrolyte slopping out when the battery is in use, and ports leading from the space in the cell above the electrolyte to said filling opening above said piston when in its normal position, by means of which the cell may be vented.

31. A storage battery cell having a suitable container with battery plates and electrolyte therein and a cover for the container, said cover having a filling opening and a removable piston inserted therein to prevent the electrolyte slopping out when the battery is in use, and ports leading from the space in the cell above the electrolyte to said filling opening above said piston when in its normal position, by means of which the cell may be vented, and said piston carrying a top member extending over the top of said cylindrical filling opening.

32. A storage battery cell having a suitable container, with the battery plates and electrolyte therein and a cover for the container, said cover having two vent passageways therethrough, one inside the other, one for entrance of air and the other for the exit of gases, the exit passageway having baffle means to prevent liquid from passing out therethrough.

33. A storage battery cell having a suitable container, with the battery plates and electrolyte therein and a cover for the container, said cover having two passageways therethrough, one inside the other, one for entrance of air and the other for the exit of gases, both of said passageways having means to prevent liquid from slopping out therethrough and means for applying suction to said exit passageway.

34. The method of ventilating a storage battery cell, which comprises the admission of a gaseous ventilating agent through a central inlet above the surface of the electrolyte of the cell, deflecting said agent over the surface of the electrolyte and removing said agent through an opening substantially concentric with said inlet.

35. In an improvement in battery cells, a cover having a centrally disposed opening, and a combined air-admitting and gas-evacuating unit located within said opening whereby to permit ingress of atmospheric air and the withdrawal of gases accumulated within the cell.

36. In an improvement in battery cells, a cover for the cell having a centrally disposed air inlet, and means for preventing inlet of water to the cell in the event of the battery compartment being flooded.

37. In an improvement in battery cells, a cover having a central opening and a combined air-admitting and gas-evacuating unit arranged in said central opening and extending both inside and outside of the cell to permit ingress of atmospheric air as gases are withdrawn from the cell, the inlet and exit passages being non-communicative except through the upper end of the cell.

38. In a battery cell a cover hermetically sealed thereon and having a central opening, a collar fitted in said opening and having a chamber at its lower end in open communication with the upper end of the cell, and also having a sleeve extending above the top of said cell, and a housing or casing surrounding said sleeve providing a chamber which is in communication with the upper end of the cell through the collar chamber and having an outlet, substantially as and for the purpose specified.

39. The herein described improvement in battery cells, comprising a cover having a centrally disposed opening formed therein and a combined air-admitting and gas-evacuating unit arranged within said opening to permit ingress of atmospheric air as gases are withdrawn therefrom and associated means to prevent ingress of water to said battery cell when the battery compartment is flooded.

40. A battery cell, a cover sealed thereon and having a central opening providing an air inlet and having an outlet surrounding said inlet, and means associated with said outlet for straining the air emitted from the cell.

ALMOND H. SNYDER.